(No Model.)
N. HARRIS.
AXLE WASHER.
No. 382,259. Patented May 1, 1888.
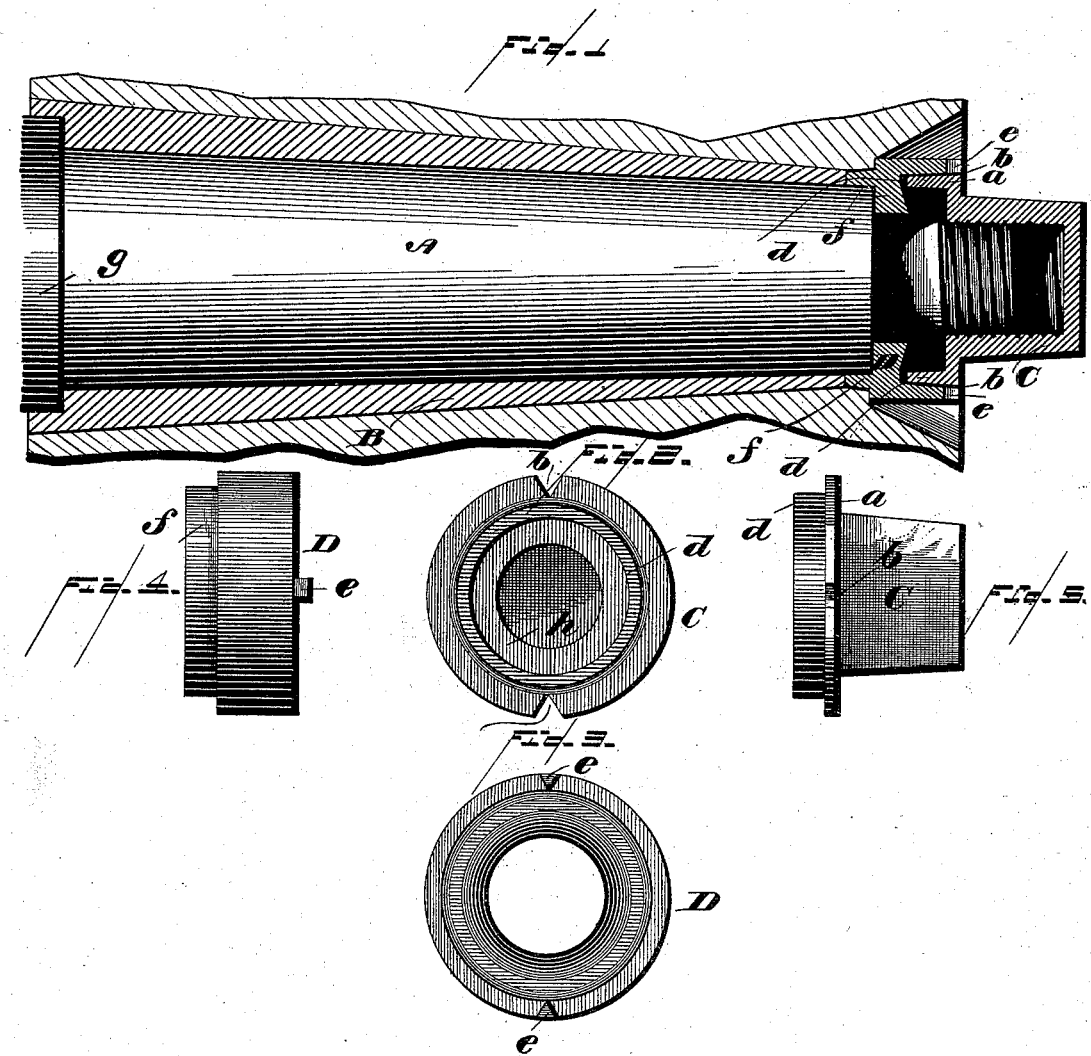
WITNESSES.
INVENTOR.
Noah Harris.
Smith & Sheehy,
Attorneys.

UNITED STATES PATENT OFFICE.

NOAH HARRIS, OF VINCENNES, INDIANA, ASSIGNOR OF ONE-HALF TO H. W. PORTER AND C. M. GRIFFITH, BOTH OF SAME PLACE.

AXLE-WASHER.

SPECIFICATION forming part of Letters Patent No. 382,259, dated May 1, 1888.

Application filed October 22, 1887. Serial No. 253,075. (No model.)

*To all whom it may concern:*

Be it known that I, NOAH HARRIS, a citizen of the United States, residing at Vincennes, in the county of Knox and State of Indiana, have invented certain new and useful Improvements in Washers; and I do declare the following to be a full, clear, and exact description of the invention, such as will enable others skilled in the art to which it appertains to make and use the same.

This invention has relation to devices for taking up the lost motion of wheels caused by the wear on the ends of the boxing, whereby the wheel is allowed to move laterally; and it consists in the novel construction, combination, and adaptation of parts hereinafter described and claimed.

The nature of the invention will be fully understood from the following description and claim, when taken in connection with the annexed drawings, in which—

Figure 1 is a longitudinal sectional view of a part of a hub of a wheel, showing the boxing worn and my improvements applied to fill the space caused thereby. Fig. 2 is an interior view of the axle-nut, showing the V-shaped notches in the collar or flange thereof. Fig. 3 is an interior view of my improved washer, showing the annular sloping or tapering flange and the lugs adapted to fit in the notches in the flange or collar of the nut. Fig. 4 is a side view of my washer; and Fig. 5 is a similar view of a nut with my improvements.

Referring to the said drawings by letter, A indicates an axle-spindle, which may be of the usual form of construction.

B indicates the metallic box of a wheel. This box is illustrated as being shortened by wear at its ends. It is well known that the boxes of wheels, by the continual friction at opposite ends, become worn and shortened, consequently allowing the wheel to play laterally upon the spindle during rotation. This motion frequently results in serious damage—such as breaking of the box and rendering the expense of a new one necessary. With the improved washer, which I shall now describe, a box which has become short by wear at the shoulder of the spindle and also at the nut may be adjusted with the wheel, so as to fill the same and serve equally as well as a new box.

C indicates the nut for the axle. This nut is closed at its outer end and internally threaded in the usual manner. On the inner end of this nut and formed integral therewith is an annular external flange, *a*, of a diameter sufficient to enter the flaring recess in the end of a hub and allow the nut to turn upon the spindle against the outer shoulder thereof. This flange is also provided at diametrical points with notches *b*, as will be hereinafter more fully explained. On the inner side of this flange *a* of the nut is formed an inwardly-directed flange, *d*, which is designed to engage the outer edge of a box when the box is new or has not been shortened by wear. When the box has become worn, as more fully shown in Fig. 1, I apply my improved washer. This washer D is adapted to be placed upon the spindle on the inner side of the nut, and embraces the inwardly-directed flange of the nut, so that the lugs or studs *e* on the said washer may enter the notches in the flange of the nut and thereby prevent either from turning without the other. This washer is also provided on its opposite or inner end with an annular flange, *f*, which has a depth sufficient to enter the space between the hub and spindle, and after crowding the shortened box against the shoulder *g* of the spindle will abut against the outer end of the said box and occupy the space caused by wear thereof. This washer also has an inner annular reduced portion, *h*, which in practice will engage the end of the spindle, and its outer beveled side will engage the inwardly-directed flange of the nut.

This construction will serve effectually to prevent the entrance of any sand or grit to the spindle.

Having described my invention, what I claim is—

A washer for the purpose described, provided with the usual aperture to receive the axle-spindle, and its inner side having an annular flange of a diameter to embrace the said spindle and engage the outer end of a wheel-box, and its outer side having suitable means for fixing it to a nut, substantially as specified.

In testimony whereof I affix my signature in presence of two witnesses.

NOAH HARRIS.

Witnesses:
H. W. PORTER,
JOHN HARRIS.